United States Patent [19]

Jones et al.

[11] 4,263,421
[45] Apr. 21, 1981

[54] PROCESS FOR COATING REACTORS USING ORGANIC COMPOUND VAPOR APPLICATION

[75] Inventors: Richard A. Jones, Avon Lake; Donald E. Witenhafer, North Olmsted, both of Ohio

[73] Assignee: The B. F. Goodrich Company, Akron, Ohio

[21] Appl. No.: 75,552

[22] Filed: Sep. 14, 1979

[51] Int. Cl.$^3$ .......................... B01J 19/00; B01J 12/02; B08B 17/00
[52] U.S. Cl. ...................................... 526/62; 427/236; 427/237
[58] Field of Search .................... 427/230, 237; 526/62

[56] References Cited

U.S. PATENT DOCUMENTS

| | | | |
|---|---|---|---|
| 3,669,946 | 6/1972 | Koyanagi et al. | 526/62 |
| 4,024,301 | 5/1977 | Witenhafer et al. | 427/230 |
| 4,024,330 | 5/1977 | Morningstar et al. | 526/62 |
| 4,068,059 | 1/1978 | Witenhafer | 526/62 |
| 4,080,173 | 3/1978 | Cohen | 427/230 X |
| 4,081,248 | 3/1978 | Cohen | 427/230 X |
| 4,105,840 | 8/1978 | Cohen | 526/62 |

Primary Examiner—James R. Hoffman
Attorney, Agent, or Firm—Roy P. Wymbs

[57] ABSTRACT

This invention relates to the reduction of polymer buildup on the inner surfaces of a polymerization reactor by applying a polymer buildup resistant coating to the inner surfaces thereof, the method or process of applying said coating being the subject of this invention. An approximate monolayer coating on the inner surfaces of the reactor results from applying thereto an aqueous or organic solvent solution of the coating material by means of vinyl chloride in vapor form. The coating material is an organic compound or polymer which is capable of resisting polymer buildup thereon. As examples of such coating materials, there may be named the polyaromatic amines, self-condensed polyhydric phenols, tannic acid and tannates, various dyes, such as nigrosine, and the like, etc. When using vinyl chloride to apply the coating material, the same reaches the inner reactor surfaces in the form of a mist. When polymerizing olefinic monomers, such as vinyl halides, vinylidene halides, and vinylidene monomers having at least one terminal $CH_2=C<$ grouping, and mixtures thereof, in the presence of said coating, polymer buildup on the inner surfaces of said reactor is substantially eliminated.

17 Claims, No Drawings

PROCESS FOR COATING REACTORS USING ORGANIC COMPOUND VAPOR APPLICATION

BACKGROUND OF THE INVENTION

In polymerization type reactions, deposit or buildup of polymer occurs on the inner surface of the reactor which not only interferes with heat transfer, but decreases productivity and adversely affects polymer quality. This problem is particularly troublesome in the commercial production of polymers and copolymers of vinyl and vinylidene halides when polymerized alone or with other vinylidene monomers having a terminal $CH_2=C<$ group, or with polymerizable monoolefinic monomers. For example, in the commercial production of vinyl chloride polymers, the same are usually produced in the form of discrete particles by polymerizing in aqueous suspension systems. When employing such systems the vinyl chloride, and other comonomers when used, are maintained in the form of small discrete droplets by the use of suspending agents and agitation. When the reaction is complete, the resultant polymer is washed and dried. The reaction is usually conducted under pressure in metal reactors or glass-lined reactors equipped with baffles and high speed agitators. However, these polymerization systems are, in many cases, unstable. As a consequence, polymer buildup forms on the interior surfaces of the polymerization reactor, including the surfaces of the baffles and agitators. Obviously this polymeric buildup must be removed due to the deleterious effect it causes.

Various methods have heretofore been proposed for removing the polymer buildup on polymerization reactor surfaces, such as solvent cleaning, the use of various hydraulic and mechanical reactor cleaners, and the like. Also, various methods have been proposed to reduce the amount of formation and the nature of polymer said surfaces of various coatings prior to polymerization. In this regard, see, for example, U.s. Pat. Nos. 3,669,946; 4,024,301; 4,024,330; and 4,081,248. These various methods and coatings have done a more than acceptable job. However, the art continues to strive to find the ultimate in the prevention of polymer buildup, particularly from an economic and environmental point of view.

Further, work continues to find more dilute coating solutions not only to reduce costs, considering the size of commercial reactors, but also to reduce the color of the coating solutions, since most all of the known and useful coating solutions are colored. These coating solutions are applied to reactor surfaces in various ways such as, for example by brushing or painting, flooding the reactor, spraying on, and the like. However, efforts continue to find the ultimate means of applying a coating to the reactor surfaces, not only from simplicity of operation and from an economic point of view on a commercial scale, but also a process of application in which the discoloration problem is substantially eliminated or substantially reduced.

SUMMARY OF THE INVENTION

It has been found that if a reaction vessel has been previously coated on the interior surfaces with the proper coating, undesirable polymer buildup on said surfaces can be substantially decreased, and in some cases entirely eliminated, when polymerizing olefinic monomers therein. We have found that various coating materials can be applied to the reactor surfaces in the form of a mist of the coating material by making such application by the use of vinyl chloride gas under pressure. As examples of suitable coating materials that may be used in the present invention are straight chain or branched polyaromatic amines, self-condensed polyhydric phenols, tannic acid and tannates, either natural or synthetic, various alkali-soluble and water-soluble dyes, organic solvent-soluble dyes, and the like. Due to the nature of the coating composition, and the method of application to the reactor surfaces of the present invention, it can be applied to said surfaces without opening the reactor thus providing a closed polymerization system. In polymerizing the olefinic monomers, the same is done in an aqueous polymerization medium which is kept in contact with said coated surfaces throughout the polymerization reaction.

DETAILED DESCRIPTION

In accordance with the present invention, a film or coating of the coating material, as hereinafter defined and described, is applied to the internal surfaces of a polymerization reactor or vessel by means of gaseous vinyl chloride under pressure. The vinyl chloride, hereinafter referred to as VCM, gas under pressure picks up the coating solution in an aspirator valve, or any other suitable apparatus, such as a vaporizer, etc., and through appropriate spray nozzles strategically mounted on the reactor, carries the coating to the reactor surfaces in the form of a mist of the coating material. All exposed surfaces in the interior of the reactor, in addition to the walls, such as the baffles, agitator, and the like, are also coated in like manner at the same time since the spray nozzles are so arranged as to cover the entire interior of the reactor. Further, since the coating is in the form of a mist, all hard to get at sections, such as blind or shadowed areas, of the reactor are likewise uniformly coated employing the instant invention. After the coating solution has been applied to said surfaces, the polymerization medium can be introduced to the reactor and the reaction started without the necessity of drying the surfaces prior to said introduction of the polymerization medium.

The VCM gas is run through the aspirator, or like apparatus, where it picks up the coating solution, under a pressure in the range of about 20 psig. to about 1000 psig. The pressure of the VCM will depend upon the nature and viscosity of the coating solution being employed, as well as the spraying system being used. Usually a pressure in the range of about 80 psig. to about 250 psig. is sufficient to give satisfactory results. The temperature of the VCM gas, as employed in the present invention, is usually in the range of about 20° C. to about 100° C. Preferably, the temperature of the VCM gas will be in the range of about 50° C. to about 80° C.

The coating solutions used in the present invention are usually aqueous solutions of the coating materials, said solutions being neutral, basic or acidic. For example, when employing a polyaromatic amine or polyhydric phenol as the coating material, an aqueous alkali metal hydroxide solution thereof can be employed. While the aqueous coating solutions are preferred, organic solvents can also be used, such as methanol and dimethyl formamide, for example. The organic solvents are particularly useful with water-insoluble systems, such as certain dyes, for example, nigrosine, and the like. Irrespective of the solvent employed in making the coating solution, a portion of the solvent, and sometimes all of the same, is vaporized as a result of the heat and pressure produced in the coating operation. In any event, the coating material reaches all the inner surfaces of the reactor in the form of a mist. As a result of the improved efficiency of the present coating process, the quantity of coating material required is considerably reduced. In fact, the amount of coating material required is reduced to the point where flushing the reactor with water, or other liquid solvent or nonsolvent, followed by stripping of the effluent and waste disposal, is no longer always necessary. The VCM gas employed in coating the reactor can be left in the reactor and become part of the reaction medium and no special apparatus or process steps are necessary for its removal. The amount of VCM gas is so small by comparison to the amount of monomer(s) in the polymer charge that it has little or no effect on the balance of the polymerization recipe. Of course, the VCM gas can be removed, if one so desires, but for cost and environmental reasons, it is best to leave the same in the reactor.

After the coating solution is made up, it is fed to the aspirator, or like apparatus, where it is picked up by the VCM gas. As previously pointed out, the coating material is carried to the reactor surfaces in the form of a mist. Depending upon the particular coating material being used, and the solvent, usually a coating solution having a concentration of coating material therein in the range of about 0.001% to about 20.0% by weight is satisfactory. Coating solutions in the range of about 0.05% to about 10.0% by weight are preferred. The concentration and amount of coating solution used will depend to a large extent on the type of coating material used and to some extent on the system employed to apply the coating. For example, when employing a polyaromatic amine as the coating material, eight ounces of a 1% by weight solution is sufficient to coat a 1100 gallon reactor using VCM gas. This is a vast improvement over coating application processes heretofore known in the art.

A number of various coating materials, which are capable of resisting polymer buildup, may be employed in making the coating solutions which are useful in practicing the process of the instant invention. Among these materials are the straight chain or branched polyaromatic amines or the condensed polyhydric phenols. The polyaromatic amines are made by the reaction of any one by itself, except the polyhydric phenols, or more than one, of the compounds selected from polyamino benzenes, polyhydric phenols, aminophenols, alkylsubstituted diphenylamines. As examples of such polyaromatic amines, there may be named a few, by way of example, such as the reaction product of m-phenylenediamine (m-PDA) and resorcinol; m-PDA and p-aminophenol; p-PDA and hydroquinone; toluene-2,4-diamine and resorcinol; self-condensed m-PDA; m-PDA, resorcinol and p-aminophenol; etc. These polyaromatic amines are clearly shown and described in U.S. Pat. No. 4,024,330, issued May 17, 1977 to Morningstar and Kehe and is incorporated herein. This patent also shows the method of making the polyaromatic amines and the method of applying the same to reactor walls by means of an organic solvent solution thereof.

In U.S. Pat. No. 4,024,301, issued May 17, 1977 to Witenhafer, Haehn, and Cohen, there is described a process of applying the straight chain or branched polyaromatic amines, described above, to the reactor surfaces using an aqueous alkali metal hydroxide solution thereof. This patent is also incorporated herein.

In U.S. Pat. No. 4,081,248, issued Mar. 28, 1978 to cohen there is described a process for applying to the reactor surfaces an aqueous alkali metal hydroxide coating solution containing a straight chain or branched polyaromatic amine, as herein described, and a dispersant operable in aqueous media. The useful dispersants, which may be so employed, are polyvinyl alcohol, polyvinyl pyrolidone, gelatin (calf skin), starch and hydroxypropyl methyl cellulose. This patent is also incorporated herein.

Another class of coating materials very useful in substantially eliminating polymer buildup in polymerization reactors is the self-condensed polyhydric phenols which are also operable in the practice of the present process using VCM as the carrier. These coating materials are shown and described in U.S. Pat. No. 4,080,173, issued Mar. 21, 1978, to Cohen, which is incorporated herein. This patent also shows the method of making the self-condensed polyhydric phenols. In the patent, there is applied to the reactor surfaces a coating composition containing, as a primary ingredient, (1) the self-condensation product of a polyhydric phenol, or (2) the condensation product of two or more polyhydric phenols, or (3) the self-condensation product of a polyhydric naphthol, dissolved in an aqueous alkali metal hydroxide solution. The polyhydric phenols used in making the condensation products are resorcinol, hydroquinone, catechol and phloroglucinol.

Another class of materials which are suitable for making aqueous coating solutions for application to reactor surfaces to substantially eliminate polymer buildup thereon, and which can be employed in the present process, are the tannins, such as, for example, tannic acid. The tannins are divided into two main groups, namely hydrolyzable tannins and condensed tannins. The tannins are usually identified from the source of extraction, that is, the tree or plant. As examples of the hydrolyzable tannins and their source, there may be named Chinese gall or tannic acid, myrobalans tannins (nuts), valonia tannins (cups and beards), chestnut tannins (wood), divi-divi tannins (pods), and the like. As examples of the condensed tannins and their source, there may be named oak tannins (bark), hemlock tannins (bark), wattle tannins (Bark), sumach tannins (leaves), quebracho tannins (wood), mangrove tannins (bark), gambier tannins (leaves), and the like. Also useful are the ammonium tannates and tannins complexed with metal ions. The tannins are shown and described in U.S. Pat. No. 4,105,840, issued Aug. 8, 1978 to Cohen and incorporated herein.

Another class of materials which are suitable for making coating solutions for application to reactor surfaces in accordance with the present process, for substantially eliminating polymer buildup, are various dyes or dyestuffs. For example, the alkali soluble dyes which can be dissolved in an aqueous alkali metal hydroxide solution or an ammonium hydroxide solution, as shown and described in U.S. Pat. No. 4,068,059, issued Jan. 10, 1978, to Witenhafer, and incorporated herein. The alkali soluble dyes are those which contain in their chemical structure one or more of the following radicals: —OH, —COOH, —SO$_3$H, and —SO$_3$Na, which radicals may be the same or different on any one dye structure. The classes of dyes which have one of said radicals are the azo dyes, such as monoazo and polyazo dyes; metal-containing azo dyes; mordant dyes; pyrazolones;

stilbene dyes, azoic dyes, phenols, naphthols; anthraquinone dyes; diphenylmethane and triphenylmethane dyes; thiazoles, nitro dyes; nitroso dyes; xanthenes; benzoquinones and naphthoquinones; and solubilized vat dyes, such as indigoids and anthraquinoids. Also the ionic dyes are useful, such as acridines, azines, oxazines, and the thiazines.

Further dyes are the water-soluble dyes which are shown and described in pending U.S. application Ser. No. 807,958, filed June 20, 1977, now abandoned, in the name of Witenhafer. These dyes contain one or more of the following radicals: —COONa, —COOH, —SO$_3$H, and —SO$_3$Na. The dyes shown in said application are incorporated herein by reference.

In addition to the dyes mentioned above, various organic solvent-soluble dyes may be used, such as nigrosine, aniline black, etc., such as shown in U.S. Pat. No. 3,669,946, issued June 13, 1972, to Koyanagi, et al.

In order to prevent polymer buildup in a reactor, it is believed that you need a water-wettable surface. When a metal or solid surface is non-wettable, a liquid, such as water, thereon will form droplets and not flow out into a smooth uniform film. An ordinary solid surface, such as stainless steel for example, is not water-wettable due to the normal contamination of said surface with organic materials through contact with the atmosphere. The surface can be cleaned, such as with chromic acid or an abrasive cleaner for example, and it will become water-wettable. However, this is not the full answer, since the surface will not remain in that condition for a sufficient length of time, that is, for more than the duration of a single polymerization reaction. That is to say, the surface must be recleaned after each polymerization cycle. Therefore, applying a coating to the surface which will be water-wettable and resist polymer buildup thereon and remain on said surface throughout multiple reaction cycles is more desired.

The wettability of a solid surface can be measured. The angle formed between the tangent of the side of the droplet and the metal or glass surface is called the "contact angle" and is referred to as "theta" ($\theta$). A further measurement of the wettability of a solid surface is the critical surface tension for wetting a solid surface and is expressed as "$\gamma c$." The "$\gamma c$" is measured in dynes per centimeter. Using water as the standard, in order for a solid surface to be wettable, $\theta$ must equal 0 or be very close to it, "$\gamma c$" must be 72 dynes/cm. or greater.

More importantly, the coating material being applied to the surface should not only form a wettable surface, but also form a continuous layer or film thereon which is not readily removable. This film or coating adheres to the solid or metal surface by adsorption and in many cases, the film is a monolayer of the coating material applied which is of the order of a molecule in thickness. These films of such thickness are invisible to the naked eye, thus further solving the color problem heretofore referred to. Of course, films of greater thickness can result when using higher solids content coating solutions which films or coatings are visible to the naked eye. The film or layer formed by the coating composition applied to the surface by VCM gas, in accordance with the present invention, is not removable by washing with water. That is to say, the coating or film is resistant to removal from the reactor surfaces when a turbulent aqueous reaction medium is in contact therewith, caused by the agitation of the polymerization mixture in the reactor.

The coating solutions useful in the present invention are made by conventional methods, using heat and agitation where necessary. Usually a temperature in the range of about 0° C. to about 100° C. is satisfactory. Agitation during dissolution of the coating material is desirable. When the concentration of the coating material is within the range given above, the coating solution thereof may be easily applied to the reactor surfaces by means of VCM gas through nozzles mounted on the reactor. Further, the molecular weight of the coating material has an effect on the concentration of the same in the coating solution or the total solids of said solution. Still further, these factors may vary the concentrations of coating materials in the coating solutions given above.

It should be pointed out that the coating compositions, used in the present invention, work equally well on glass, or metal surfaces, such as stainless steel and the like. While the exact mechanism of adhesion of the coating to the surfaces of the reactor is not known for certain, it is believed to involve some type of electrical force or adsorption between the reactor surfaces and the coating material, particularly with some coating solutions. At any rate, the coating compositions useful in the present invention do substantially eliminate polymer buildup on said surfaces and what little polymer buildup, if any, that may occur is of the "sandy" type which is of such a nature that it is readily removable from the reactor surfaces without the necessity of manual scraping procedures. The polymer buildup to be avoided is what is referred to as "paper" buildup since this type of buildup is very difficult to remove and usually requires hand scraping or the use of a high pressure jet stream of water or other liquid. In either event, the reactor must be opened in order to clean the same, which of course allows the escape of unreacted monomer, such as vinyl chloride, into the atmosphere which is hazardous to health.

Using the VCM gas application of the coating, in accordance with the present invention, multiple polymerizations may be run without opening the reactor between charges. Although multiple charges may be run without recoating the surfaces, it has been found to be expeditious, and preferred, to recoat the reactor after every charge, or every few charges, to insure uniform and efficient production. This is very easily done using the VCM gas application of the coating composition through the spray nozzles, as heretofore described. When it is decided to recoat the reactor, the reactor is drained, and the inner surfaces are flushed with water by means of the spray nozzles to remove all loose polymer particles thereon. Then the coating is applied by means of the VCM gas. Thereafter, the reactor is charged with the polymerization medium and ingredients in the usual manner and the polymerization reaction commenced. It is understood, of course, that one can recoat the reactor as often as desired without opening the same, even after every charge is polymerized. It should also be noted that no particular modification of polymerization processing techniques are required due to the presence of the coating. Further, utilization of the internally coated reaction vessel of the present invention does not adversely affect the heat stability or other physical and chemical properties of the polymers produced therein.

While the present invention is specifically illustrated with regard to the suspension polymerization of vinyl chloride, it is to be understood that the instant process may likewise be applied in the dispersion, emulsion or suspension polymerization of any polymerizable ethylenically unsaturated monomer or monomers where undesirable polymer buildup occurs. Examples of such monomers are other vinyl halides and vinylidene halides, such as vinyl bromide, vinylidene chloride, etc., vinylidene monomers having at least one terminal $CH_2=C<$ grouping, such as esters of acrylic acid, for example, methyl methacrylate, ethyl acrylate, butyl acrylate, octyl acrylate, cyanoethyl acrylate, and the like; vinyl acetate; acrylonitrile; esters of methacrylic acid, such as methyl methacrylate, butyl methacrylate, and the like; styrene and styrene derivatives including α-methyl styrene, vinyl toluene, chlorostyrene, etc., vinyl naphthalene; diolefins including butadiene, isoprene, chloroprene, and the like; and mixtures of any types of these monomers and other vinylidene monomers copolymerizable therewith; and other vinylidene monomers of the types known to those skilled in the art.

The present invention, however, is particularly applicable to the suspension polymerization of vinyl chloride, either alone or in a mixture with one or more other vinylidene monomers having at least one terminal $CH_2=C<$ grouping, copolymerizable therewith in amounts as great as about 80% or more by weight, based on the weight of the monomer mixture, since polymer buildup is a problem in this area.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures, polymers having the most beneficial properties are produced. The time of the polymerization reaction will vary from about 2 to about 15 hours.

The polymerization process may be carried out at autogeneous pressures, although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

The various coatings, as particularly set forth in the specific examples, which follow hereinafter, were rated by visual observation.

In order to further illustrate the present invention, the following specific examples are given. It is to be understood, however, that this is merely intended in an illustrative and not limitative sense. In the examples, all parts and percents are by weight unless otherwise indicated.

EXAMPLE I

In this example, an uncoated reactor was employed to establish a control. The reactor surfaces were cleaned with high pressure water prior to charging the polymerization ingredients. First, 630 gallons of demineralized water (52° C.) were added to the reactor followed by the addition of 72 pounds of a 3% by weight aqueous solution of hydroxylpropyl methyl cellulose with agitation. Then the reactor was closed and evacuated to 25 inches of mercury without agitation. The catalyst was then added, which was 0.54 pound of disecondary butyl peroxydicarbonate as a 20% solution in hexane. The agitator was then started and 3000 pounds of vinyl chloride was added to the reactor. The reaction mixture was then heated to 52° C. and the polymerization reaction was carried out at this temperature for 8.5 hours. During the course of the reaction, demineralized water was added at the rate of 0.27 gallons per minute to compensate for the decrease in volume due to the formation of polymer. The polymerization was stopped after a pressure drop of 4 psig. or 8.5 hours. After recovering the polymer produced, the reactor was rinsed with water and and three additional charges were run in the reactor in like manner. After the fourth charge, the reactor was examined for polymer buildup. All of the internal surfaces were heavily coated with knots or lumps of polymer and paper buildup. The control reactor, with no coating on the internal surfaces thereof was classified as "dirty."

EXAMPLE II

In this example, the reactor was coated prior to conducting the polymerization reaction therein. The coating solution employed herein comprised 3 grams of nigrosine Z1630 dissolved in 8 ounces of dimethyl formamide. The VCM gas was introduced into the reactor through a spray nozzle mounted on the reactor and under a pressure of 150 psig. After about 5 seconds of good VCM gas flow, the coating solution was slowly added to the VCM gas stream and carried to the inner surfaces of the reactor as a mist. The coating operation took about 20 seconds and upon completion, the reactor surfaces were rinsed with demineralized water. (Note: this step is optional.) After rinsing, the reactor was charged using the recipe and procedure of Example I. Thereafter, the reaction mixture was heated to 52° C. and held at this temperature throughout the polymerization reaction which was complete in 8.5 hours. After this charge was completed, the polymer was removed and 3 additional charges were run in the reactor in like manner. Prior to each additional charge, the reactor surfaces were coated in the same manner as described above. Upon examination of the reactor, after completion of the fourth charge, it was found that all the surfaces were clean or substantially free of polymer buildup. What little buildup that was present, was the soft sandy type and readily removable with finger tip pressure. There was no paper buildup present showing the improvement over the uncoated or control reactor of Example I.

EXAMPLE III

In this Example, the inner surfaces of the reactor were coated with an aqueous alkali metal hydroxide solution of a self-condensed polyhydric phenol, namely resorcinol. The self-condensed resorcinol was made in accordance with the procedure shown in U.S. Pat. No.

4,080,173. A coating solution concentrate was made up as follows:

15% self-condensed resorcinol
10% NaOH
75% Water (demineralized)

Twenty cc's of the above solution in 8 ounces of demineralized water was then used to coat the internal surfaces of the reactor. The reactor was coated in the same manner as shown in Example II. Again, using the polymerization recipe and procedure of Example I, four charges wre made, with rinsing and coating of the inner surfaces after each charge. After the fourth charge was complete and the polymer removed, the reactor was examined and found to be in very good condition with respect to polymer buildup. There was no paper buildup and only a few soft sandy spots which were readily removable. The condition of the reactor was far superior to that of the control of Example I.

Coating the internal surfaces of a polymerization reactor by means of the present process not only substantially eliminates polymer buildup thereon, but also, less coating material is used than heretofore, thus providing a more economic coating process. With the present process, one is enabled to operate a closed polymerization system which, in the case of vinyl chloride polymerization, has the advantage of reducing the parts per million of vinyl chloride in the plant to a point that meets Governmental regulations. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

we claim:

1. A process for substantially eliminating the buildup of polymer on the internal surfaces of a polymerization reaction vessel for polymerizing olefinic monomer(s) which comprises, making a coating solution of a coating material which, in the form of a film, is capable of resisting polymer buildup thereon, applying said coating material to said surfaces by means of vinyl chloride gas, said vinyl chloride gas acting as a carrier for said coating material, and thereafter conducting the polymerization of said monomer(s) while in constant contact with the coated internal surfaces of said vessel.

2. A process as defined in claim 1 wherein the monomer is vinyl chloride.

3. A process as defined in claim 1 wherein the coating material is present in said coating solution in an amount in the range of about 0.001% to about 20.0% by weight.

4. A process as defined in claim 1 wherein the temperature of the vinyl chloride gas is in the range of about 20° C. to about 100° C. and said vinyl chloride gas is under a pressure of about 20 psig to about 1000 psig.

5. A process as defined in claim 1 wherein the coating material is a polyaromatic amine made by the condensation reaction of any one by itself or more than one of the compounds selected from the group consisting of polyamino benzenes, polyhydric phenols, aminophenols, alkyl-substituted aminophenols, diphenylamines, and alkyl-substituted diphenylamines.

6. A process as defined in claim 5 wherein the coating solution is an organic solvent solution of the polyaromatic amine.

7. A process as defined in claim 5 wherein the coating solution is an aqueous alkali metal hydroxide solution of the polyaromatic amine.

8. A process as defined in claim 7 wherein the coating solution contains a dispersant operable in aqueous media and selected from the group consisting of polyvinyl alcohol, polyvinyl pyrrolidone, gelatin (calf skin), starch, and hydroxypropyl methyl cellulose.

9. A process as defined in claim 1 wherein the coating solution is comprised of an aqueous alkali metal hydroxide solution containing a condensation product selected from the group consisting of the self-condensation product of one or more polyhydric phenols, and the self-condensation product of a polyhydric naphthol, and wherein said polyhydric phenol(s) is selected from the group consisting of resorcinol, hydroquinone, catechol and phloroglucinol.

10. A process as defined in claim 1 wherein the coating solution is comprised of an aqueous solution of a tannin, said tannin being selected from the group consisting of hydrolyzable tannins, condensed tannins, ammonium tannates, and tannins complexed with metal ions.

11. A process as defined in claim 10 wherein the monomer is vinyl chloride.

12. A process as defined in claim 1 wherein the coating solution is comprised of an aqueous alkali metal hydroxide solution of an alkalisoluble dye, said dye having one or more radicals in its chemical structure selected from the group consisting of —OH, —COOH, —SO$_3$H, and —SO$_3$Na.

13. A process as defined in claim 12 wherein the dye is an ionic dye selected from the group consisting of acridines, azines, oxazines, and thiazines.

14. A process as defined in claim 1 wherein the coating solution is comprised of an organic solvent solution of an organic solvent-soluble dye.

15. A process as defined in claim 14 wherein the dye is nigrosine and the solvent is dimethyl formamide.

16. A process as defined in claim 1 wherein the coating solution is comprised of an aqueous solution of a water-soluble dye, said dye having one or more radicals in its chemical structure selected from the group consisting of —COONa, —COOH, —SO$_3$H and —SO$_3$Na.

17. A process as defined in claim 1 wherein the monomers are vinyl chloride and vinyl acetate.

* * * * *

UNITED STATES PATENT AND TRADEMARK OFFICE
CERTIFICATE OF CORRECTION

PATENT NO. : 4263421
DATED : April 21, 1981
INVENTOR(S) : RICHARD A. JONES and DONALD E. WITENHAFER It is certified that error appears in the above-identified patent and that said Letters Patent are hereby corrected as shown below:

Column 1, line 37, after the word "polymer" add--buildup on said surfaces, such as the application to--; Column 4, line 66, after the word "one" add--or more--.

Signed and Sealed this

Thirty-first Day of August 1982

[SEAL]

Attest:

GERALD J. MOSSINGHOFF

Attesting Officer

Commissioner of Patents and Trademarks